United States Patent
Yang et al.

(10) Patent No.: US 8,218,200 B2
(45) Date of Patent: Jul. 10, 2012

(54) IMAGE PROCESSING SYSTEM, IMAGE PROCESSING METHOD, AND STORAGE MEDIUM

(75) Inventors: Hong Yang, Ibaraki-ken (JP); Tsutomu Kurose, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 605 days.

(21) Appl. No.: 12/382,730

(22) Filed: Mar. 23, 2009

(65) Prior Publication Data
US 2009/0237738 A1    Sep. 24, 2009

(30) Foreign Application Priority Data
Mar. 24, 2008    (JP) ................ P2008-076585

(51) Int. Cl.
    *H04N 1/40*    (2006.01)
(52) U.S. Cl. ........................ 358/1.9; 358/530
(58) Field of Classification Search ............ 358/2.1, 358/1.9, 500, 504, 529–530; 382/162–164
    See application file for complete search history.

(56) References Cited

U.S. PATENT DOCUMENTS
5,923,349 A * 7/1999 Meyer ................... 347/43

FOREIGN PATENT DOCUMENTS
| JP | 2000-132671 A | 5/2000 |
| JP | 2001-005954 A | 1/2001 |
| JP | 2001-160906 A | 6/2001 |
| JP | 2002-225381 A | 8/2002 |
| JP | 2002-361933 A | 12/2002 |
| JP | 2006-135936 A | 5/2006 |

OTHER PUBLICATIONS

Official Action, issued on Mar. 6, 2012, in the counterpart Japanese application, seven (7) pages.

* cited by examiner

*Primary Examiner* — Thomas D Lee
*Assistant Examiner* — Stephen M Brinich
(74) *Attorney, Agent, or Firm* — The Nath Law Group; Jerald L. Meyer; Stanley N. Protigal (57) ABSTRACT

A color conversion is performed to convert a data of a pixel of black in an object as determined to be a mask into a pixel data of composite black, and convert a data of a pixel of black in an object as not determined to be any mask into a pixel data of composite black or real black, and a set of pixel data of an object as color-converted is operated and processed as a source.

7 Claims, 8 Drawing Sheets

D (DESTINATION)     S (SOURCE)     D = S

FIG. 5B

D (DESTINATION)     S (SOURCE AS MASK FOR COND 4/5)     D AND S

FIG. 5C

D (DESTINATION)     S (SOURCE AS ACTUAL FOR COND 4/6)     D OR S

D (DESTINATION)    S (SOURCE AS MASK FOR COND 5)    D OR /S

FIG. 8B

D (DESTINATION)    S (SOURCE AS ACTUAL FOR COND 5)    D AND S

IMAGE PROCESSING SYSTEM, IMAGE PROCESSING METHOD, AND STORAGE MEDIUM

FIELD OF THE INVENTION

The present invention relates to an image processing, and in particular, to an image processing before a raster operation.

DESCRIPTION OF RELATED ART

As disclosed in Japanese Patent Application Laid-Open Publication No. 2006-135936, there is a raster operation (referred herein sometimes to "ROP") known in the art of image processing system, as an operation between a source as a set of pixel data to be drawn and a destination as a set of pixel data to be output to draw an image, for reflection of results of the operation on associated pixel data. The raster operation employs a logic operation or the like to permit a facilitated expression of superimposed objects of an image to be drawn.

Some objects of images to be drawn may be locally transparent. An object having such a transparent region may be superimposed on another object and be processed as a source by a simple logic operation. Here the transparent region may be deemed as opaque white, and a corresponding region of the other object may be hidden behind the transparent region.

For avoidance of that, there is a technique in use for a transparent region to see an underlying object therethrough. Here a combination of a mask corresponding to the transparent region and a real image is employed to implement a double-staged rater operation. In this method the mask is filled with black in all area except for a transparent region and is combined with a destination to perform an AND operation in between. And then the result is combined with the real image filled with black in a region corresponding to the transparent region to perform an OR operation in between, whereby an image seeing the underlying object through the transparent region is obtained.

SUMMARY OF THE INVENTION

ROP-oriented systems such as a printer deriver and a printer controller have configurations to: input a set of an object including a set of image data expressed in an RGB form and an ROP code designating an operation from an associated operating system, application, or the like; convert the data format into a CMYK form; and perform an operation in accordance with the ROP code.

For a printing in CMYK form, associated pixels are typically expressed in a binarized CMYK form, affording to use two expressions of black pixel, so-called a "real black" such that C=M=Y=1, K=0, and so-called a "composite black" such that C=M=Y=K=0. As used herein, '0' is to dot and '1' not to dot. In general, the real black is better in reproduction and is free of anxiety about color shift, and so it is desirable in most cases to express black pixels of object in real black.

Figure 9A:
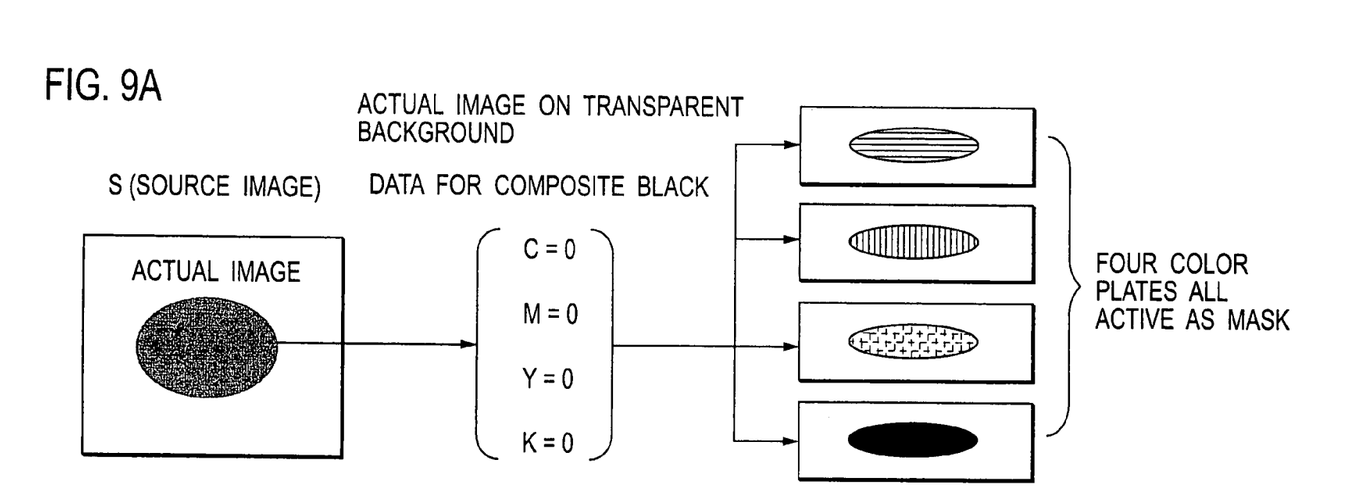
FIGS. 9A and 9B provide a set of illustrations for explanation of color separation of a pixel data of composite black and a pixel data of real black.
Figure 9B:
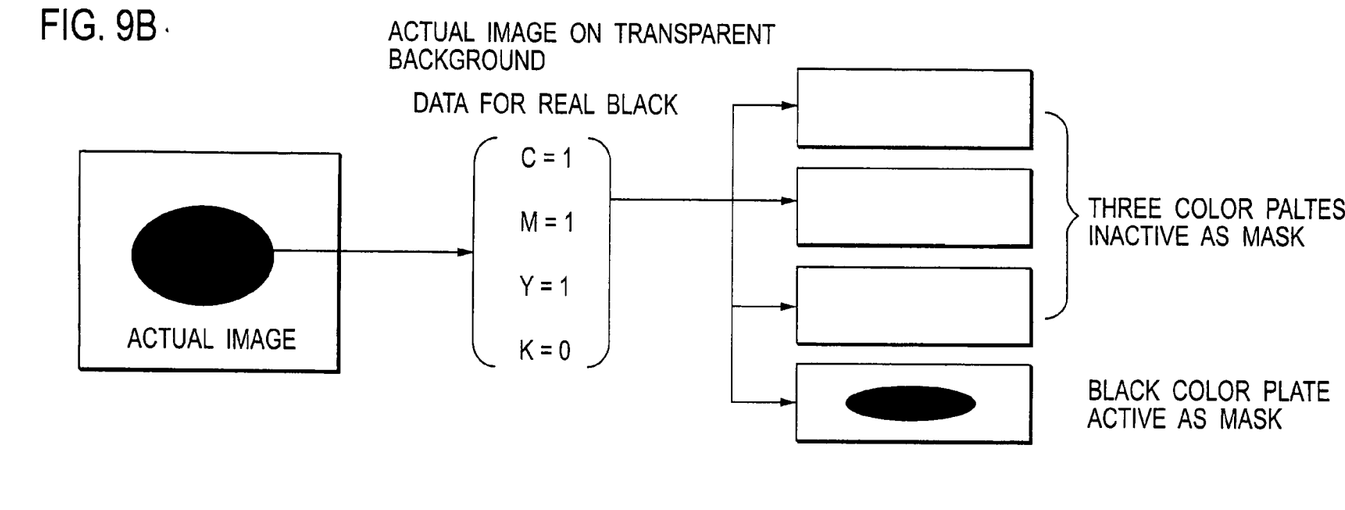

For black pixels in a mask, the logic operation in combination with a destination is performed for any color of C, M, Y, and K, each of which is to be '0'. Therefore, as shown in FIGS. 9A and 9B, for black pixels in object all expressed in real black, each data set of C, M, and Y gets inactive as a mask. FIGS. 9A and 9B are illustrations for explanation of color separation of a pixel data of composite black and a pixel data of real black.

To this point, it is an object of the present invention to provide a technique allowing for an improved color reproduction in a raster operation of image drawing objects having a transparent region without losing a mask function.

To achieve the object described, according to a first aspect of the present invention, an image processing system is adapted to input a sequence of image drawing objects each respectively including a set of data on pixels of a cell of color image and a raster operation code, hold a set of pixel data of an arbitrary object to be processed as a source for a raster operation in accordance with an associated raster operation code, and hold a set of pixel data of an object to be output as a destination, and comprises a determiner configured to determine an n-th input object (n being an integer) to be a mask, as the n-th input object fills a first criterion as requisite for the n-th input object to be determined as a mask and an n+1-th input object fills a second criterion as sufficient for a presumption for the n+1-th input object to be masked by the n-th input object, a converter configured for a color conversion to convert a data of a pixel of black in an object as determined to be a mask into a pixel data of composite black, and convert a data of a pixel of black in an object as not determined to be any mask into a pixel data of composite black or real black, and a processor configured to operate and process as a source a set of pixel data of an object as color-converted.

According to a second aspect of the present invention, in the image processing system according to the first aspect, the converter is configured to convert a pixel data of a first pixel of black in an m-th input object (m being an integer) as not determined to be any mask into a pixel data of composite black, as the first pixel corresponds in pixel position to a pixel of white in an m−1-th input object as determined to be a mask, and convert a pixel data of a second pixel of black in the m-th input object into a pixel data of real black, as the second pixel corresponds in pixel position to a pixel of color else than white in the m−1-th input object as determined to be a mask, According to a third aspect of the present invention, in the image processing system according to the first aspect, the first criterion comprises each pixel in the n-th input object being black or white, and a raster operation code of the n-th input object including:

"D (destination) AND S (source)";
"D OR (NOT S)";
"D AND (NOT S)"; or
"D OR S".

According to a fourth aspect of the present invention, in the image processing system according to the third aspect, the second criterion comprises a drawing region of the n+1-th input object lapping over a drawing region of the n-th input object, and a raster operation code of the n+1-th input object having to the raster operation code of the n-th input object a correspondence relationship of:

"D OR S" to "D AND S";
"D AND S" to "D OR (NOT S)";
"D OR S" to "D AND (NOT S)"; or
"D AND S" to "D OR S".

According to a fifth aspect of the present invention, in the image processing system according to the first aspect, the processor comprises a binarizer configured to binarize a pixel data of the object as color-converted by prescribed colors.

According to a sixth aspect of the present invention, an image processing method comprises inputting a sequence of image drawing objects each respectively including a set of data on pixels of a cell of color image and a raster operation code, holding a set of pixel data of an arbitrary object to be processed as a source for a raster operation in accordance with an associated raster operation code, holding a set of pixel data of an object to be output as a destination, determining an n-th input object (n being an integer) to be a mask, as the n-th input object fills a first criterion as requisite for the n-th input object to be determined as a mask, and an n+1-th input object fills a second criterion as sufficient for a presumption for the n+1-th input object to be masked by the n-th input object performing a color conversion to convert a data of a pixel of black in an object as determined to be a mask into a pixel data of composite black, and convert a data of a pixel of black in an object as not determined to be any mask into a pixel data of composite black or real black, and operating and processing as a source a set of pixel data of an object as color-converted.

According to a seventh aspect of the present invention, a storage medium comprises a stored program to have a computer execute an image processing method according to the sixth aspect.

DETAILED DESCRIPTION OF THE PREFERRED EMBODIMENTS

Figure 1:
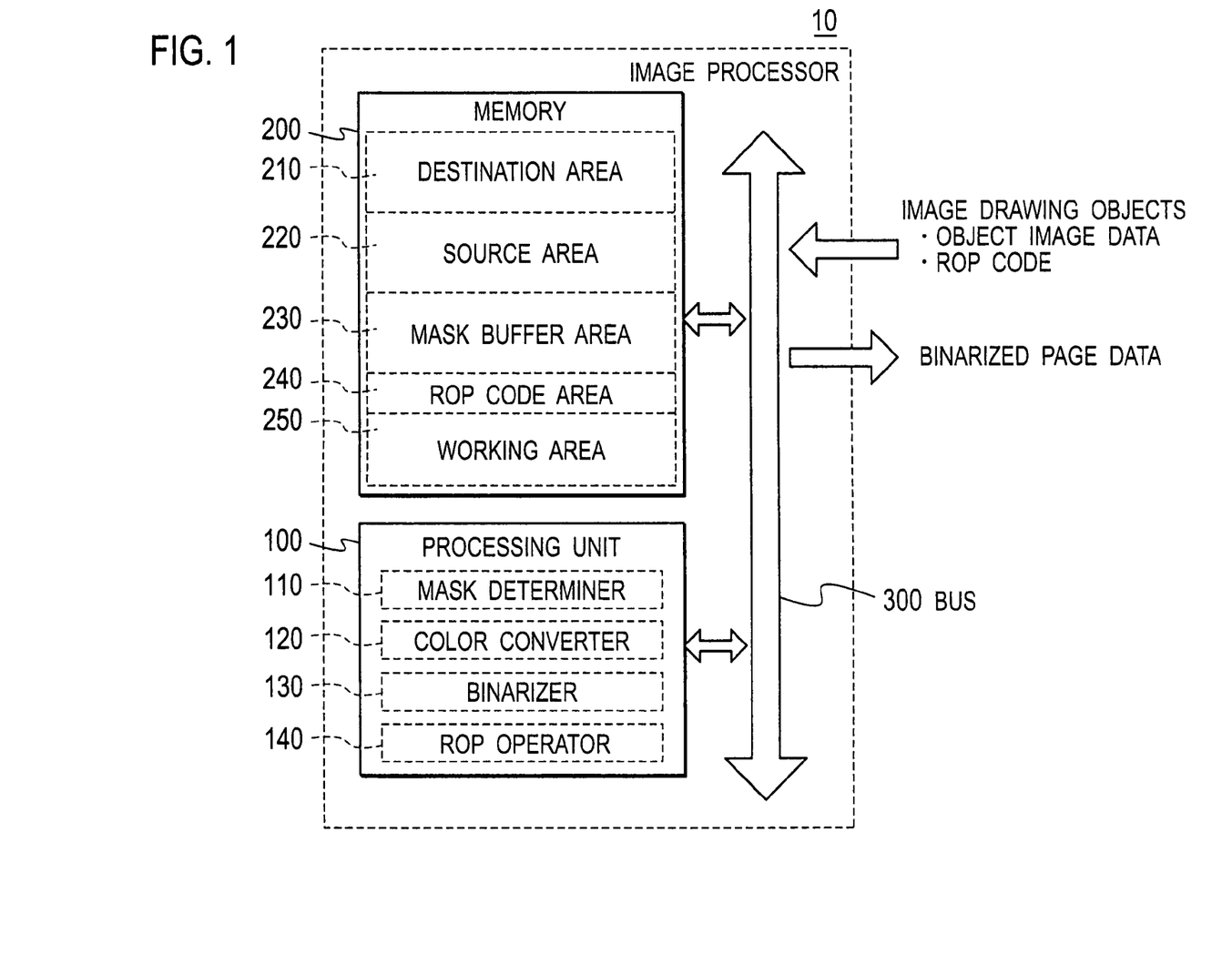
FIG. 1 is a block diagram of an image processor according to an embodiment of the present invention.

There will be described the preferred embodiments of the present invention with reference to the drawings. FIG. 1 is a block diagram of an image processor 10 as an image processing system according to an embodiment. The image processor 10 is adapted to sequentially input a set of image drawing objects constituting a page and to output a set of binarized data of the page. The image processor 10 is adaptive as a printer driver or printer controller for instance.

Each image drawing object is a data set as output from an operating system, application, or the like, and includes: a set of image data of the object represented in an RGB form; and an ROP code indicating an operation in an associated ROP process. The set of binarized data is a data set representing constituent pixels of a page in terms of bits of a CMYK form.

The image processor 10 is made up by a processing unit 100 such as a CPU and a memory 200 with a bus 300 for their connections. The processing unit 100 includes: a mask determiner 100 for a decision to determine whether or not an input image drawing object is a mask; a color converter 120 for converting a set of image data of RGB form into a set of image data of CMYK form by use of a lookup table or the like; a binarizer 130 for binarization of CMYK data by way of a pattern dither, error diffusion, etc; and an ROP operator 140 for raster operation. Each component described may be implemented as software for execution of programs or hardware using a wired logic or the like.

The memory 200 has storage areas formed therein, including: a destination area 210 for storing a series of sets of image data to be drawn each as a destination of an associated raster operation; a source area 220 for storing a series of sets of image data of input objects each as a source to be raster-operated; a mask buffer area 230 for temporary storage of a set of image data of an object as provisionally determined to be a mask by the mask determiner 110; an ROP code area 240 for storing a series of ROP codes of input image drawing objects; and a working area 250 for other operations and processes.

Figure 2:
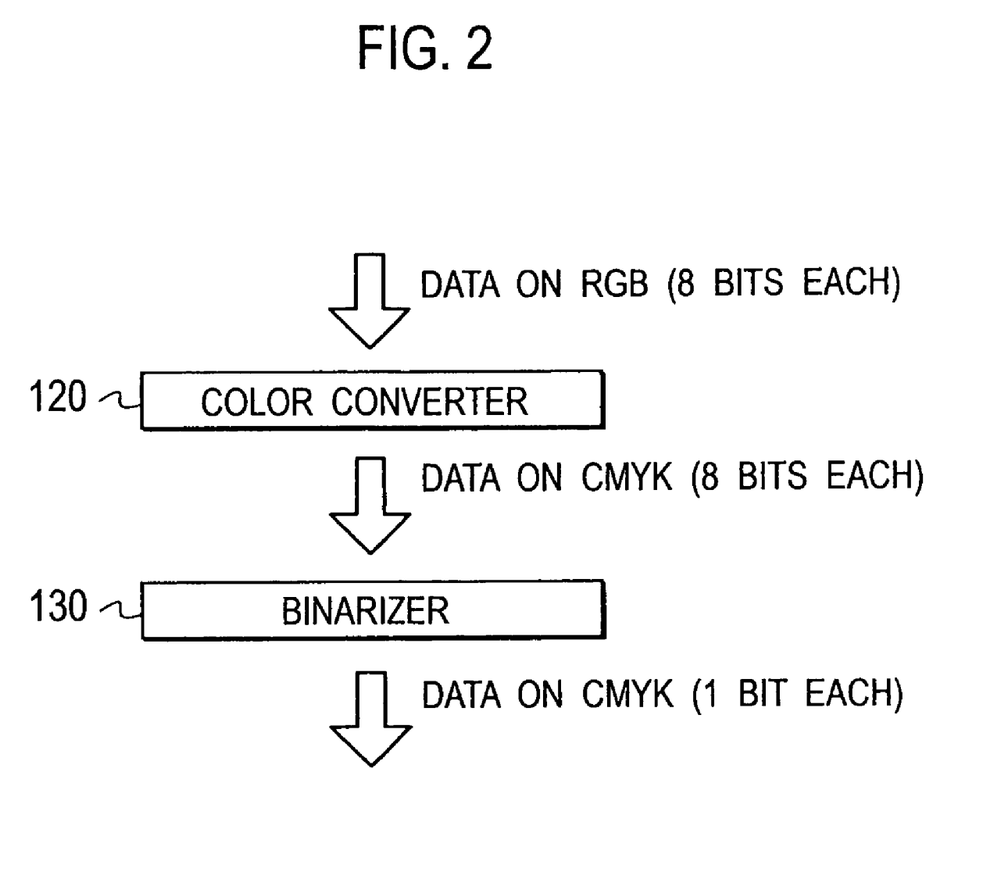
FIG. 2 is a block diagram of a color converter and a binarizer of the image processor of FIG. 1.

FIG. 2 illustrates, in a block diagram, a combination of the color converter 120 and the binarizer 130. As illustrated in FIG. 2, according to this embodiment, the color converter 120 is adapted for a color conversion of a set of image data of object composed of data on R, G, and B of eight bits each into a set of image data composed of data on C, M, Y, and K of eight bits each. The binarizer 130 is adapted for a successive binarization into a set of image data composed of data on C, M, Y, and K of one bit each. The ROP operator 140 is adapted for a raster operation after the binarization. Such the raster operation following binarization allows for a reduced occupation or saved capacity in the memory 200, and an enhanced processing rate relative to a raster operation of multi-value data, whereas the present invention may be implemented for application to a multi-value raster operation as well.

The present invention is in no way restricted to a raster operation of image data in a CMYK form, and may be implemented for applications to, e.g., a printing using a pair of colors such as red and black, as well as to other forms of color expression. In particular, it has an effective application to a form including a specific color, such as black, that can be expressed in different manners. In such cases also, a binarization of each color may well be performed before a raster operation, allowing for a reduced occupation or saved capacity in the memory 200, and an enhanced processing rate.

Figure 4A:
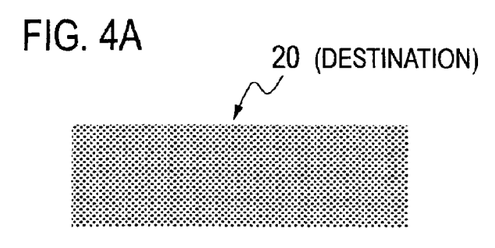
FIGS. 4A to 4G provide a set of illustrations for explanation of raster operations using an object with a transparent region.
Figure 4B:
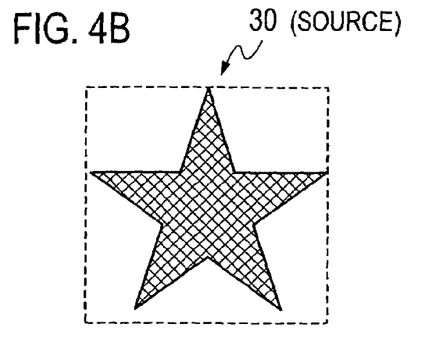
Figure 4C:
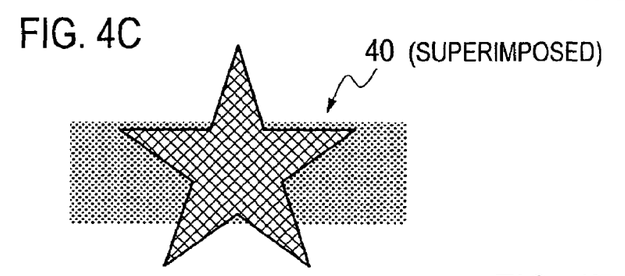

There will be described below a typical method of handling an object with a transparent region in a raster operation by the ROP operator 140. The description is done with an example that a rectangular object 30 illustrated in FIG. 4B with a star depicted amid a surrounding transparent region is superimposed on a background image 20 illustrated in FIG. 4A for preparation of a superimposed image 40 illustrated in FIG. 4C such that the background image 20 is seen through the transparent region surrounding the star.

There are two logic operations "AND" and "OR" for use raster operation. Table 1 lists results of AND operations and OR operations between a destination D and a source S, letting black be '0' and white be '1'. As will be seen from the results, through AND operations, black pixels in the source are rendered black, and white pixels in the source have values of corresponding pixels in the destination held as they are. Through OR operations, white pixels in the source are rendered white, and black pixels in the source have values of corresponding pixels in the destination held as they are.

TABLE 1

Logical AND and OR operations between D (destination) and S (source)

| D | S | D AND S | D OR S |
| --- | --- | --- | --- |
| 0 (black) | 0 (black) | 0 (black) | 0 (black) |
| 1 (white) | 0 (black) | 0 (black) | 1 (white) |
| 0 (black) | 1 (white) | 0 (black) | 1 (white) |
| 1 (white) | 1 (white) | 1 (white) | 1 (white) |

Figure 4D:
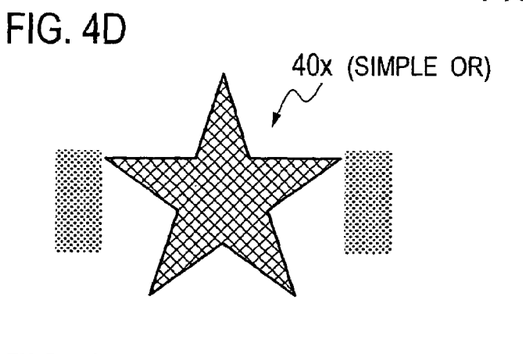
Figure 4E:
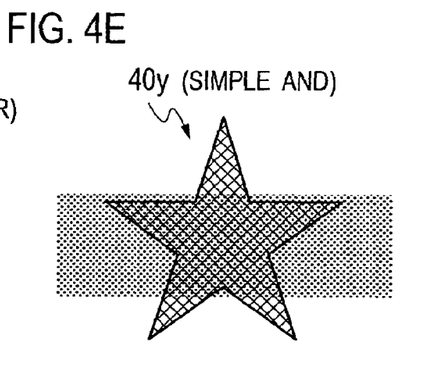

A simple pixel-wise OR operation between the background image 20 and he object 30 with a transparent region would have resulted in such a superimposed image 40x as illustrated in FIG. 4D failing to see the background image 20 through the transparent region, where it is deleted. A simple pixel-wise AND operation between the background image 20 and the object 30 with a transparent region would have resulted in such a superimposed image 40y as illustrated in FIG. 4E in which the background image 20 fills in an associated region of the object 30.

Figure 4F:
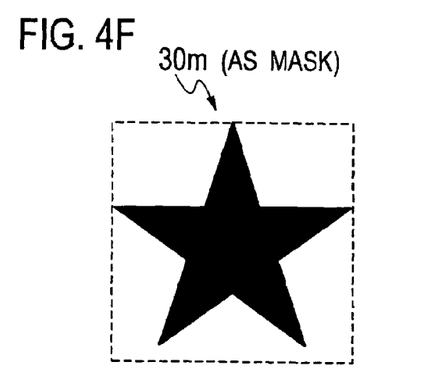
Figure 4G:
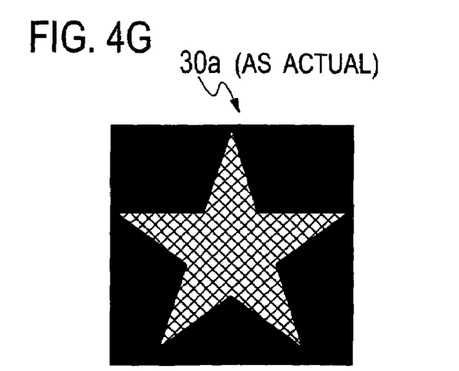

To this point, for an object of image 30 that has a transparent region, the operation employs a combination of an object prepared as a mask 30m corresponding to the above-noted object 30, as it is blacked out in all area except for the transparent region, as illustrated in FIG. 4F, and an object prepared as an actual or real image 30a corresponding to the object 30, as it is blacked out in the transparent region, as illustrated in FIG. 4G. The object of mask 30m, as well as the object of real image 30a, may be prepared by an operating system, or by an application, as circumstances require. In the embodiment, pixels have binary values set to '0' for black and '1' for white, for comprehension with ease. For the processing of CMYK form, a raster operation is performed for each color, and the mask-filling black should be C=M=Y=K=0. For raster operations in a multi-value state, such as an eight-bit form, not one bit each of CMYK, each bit should be '0'.

Figure 5A:
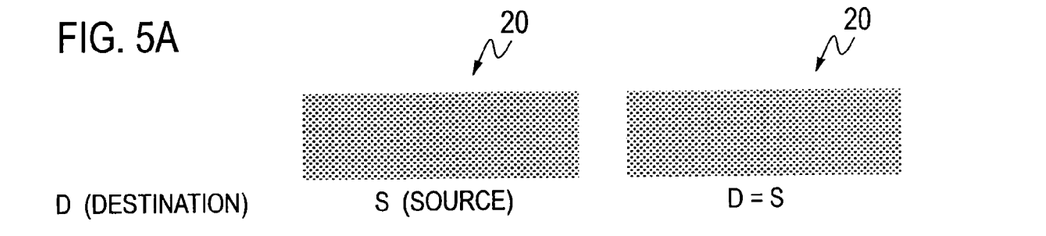
FIGS. 5A to 5C provide a set of illustrations for explanation of raster operations using an object with a transparent region.
Figure 5B:
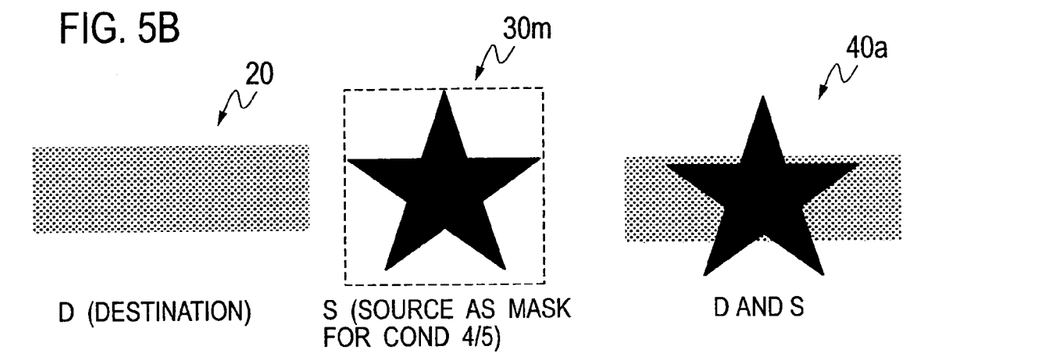
Figure 5C:
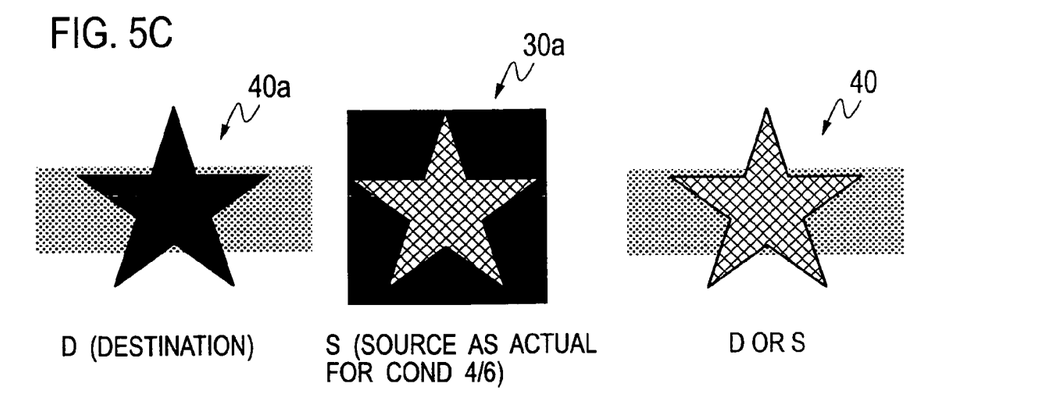

Description is now made of associated operations. First as illustrated in FIG. 5A, using the background image 20 as a source S, an operation of D=S is performed. The background image 20 is thereby set as a destination. Next, as illustrated in FIG. 5B, using the mask 30m as a source, an operation of D AND S is performed. Through the AND operation, black pixels in the source are rendered black, and white pixels in the source have values of corresponding pixels in the destination held as they are, whereby set is a destination as a superimposed image 40a in which a black region of the mask 30m is superimposed on the background image 20. Then, using the real image 30a as a source, an operation of D OR S is performed. Through the OR operation, white pixels in the source are rendered white, and black pixels in the source have values of corresponding pixels in the destination held as they are, whereby obtained is a superimposed image 40 seeing the background image 20 through a transparent region surrounding the star. It is noted that operations and object combinations are in no way restricted to those described, and the superimposed image 40 is obtainable by different combinations, as well.

Figure 3:
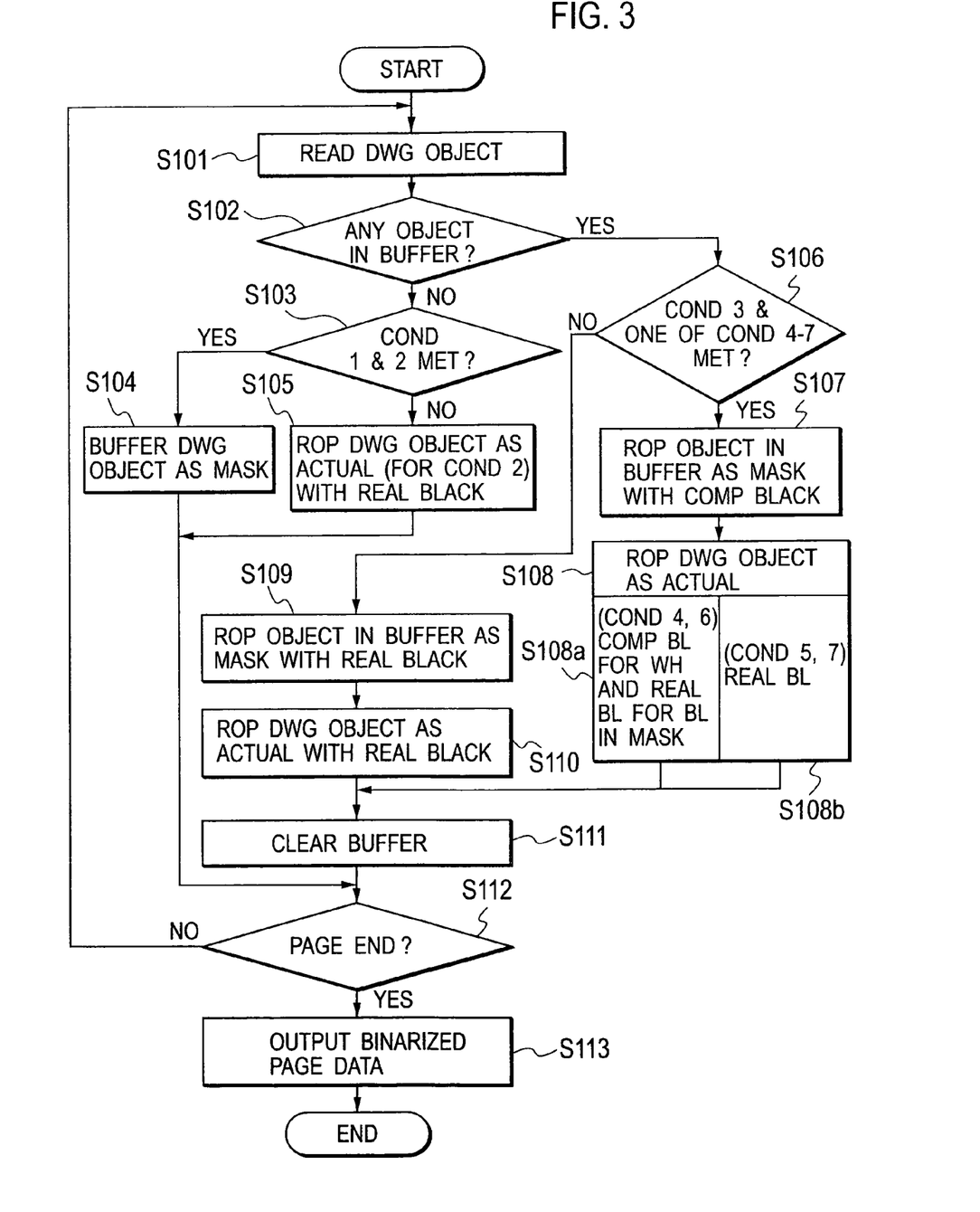
FIG. 3 is a flowchart of actions of the image processor of FIG. 1.

Description is now made of actions in a process of the image processor 10 in this embodiment, with reference to a flowchart of FIG. 3. This process is for a sequential reading of a series of image drawing objects constituting a page, to output a binary page data. Each image drawing object is assumed as including a set of image data and an ROP code, and carrying no effective information to define whether it is a mask or a real image else than the mask. Object image data else than mask is referred herein sometimes to a usual data.

At a step S101, the image processor 10 reads an image drawing object, as it is input from an associated operating system, application, or the like. Read object has a set of image data and an ROP code. The image processor 10 stores the image data set in the source area 220, and the ROP code in the ROP code area 240.

At a decision step S102, it is determined whether or not the mask buffer area 230 has a data stored therein. The mask buffer area 230 is provided as an area for temporary storage of an image data set of an object as temporarily determined to be a mask by the mask determiner 110. If a data is stored in the mask buffer area 230, this state means a previously read image drawing object has been temporarily determined to be a mask, that is, an image data set of the previous object may be an object image data to be processed as a mask.

As a result, unless a data is stored in the mask buffer area 230 (NO at the step S102), the flow goes to another decision step S103 to temporarily determine whether or not the currently read object is a mask. The read object is assumed as carrying no direct information to define whether it is a mask or not, and the possibility of its being a mask is determined in the following manner.

There is a first criterion to be filled, including two conditions being a condition 1 and a condition 2 to be both met to temporarily determine the currently read object to be a mask:

Condition 1: each pixel of the object image data set to be black or white. If the object image data is expressed in an RGB form of eight bits each, the white is R=G=B=255, and the black is R=G=B=0; and Condition 2: the ROP code to be "D AND S", "D AND S", "D OR /S", or "D OR S", where '/' denotes "NOT".

This is for a temporary determination, not a final, on presence or absence of the possibility of being a mask.

It is noted that the mask determination may employ ROP codes complying with XOR logic.

As a result, if the first criterion is filled (YES at the step S103), the object image data set is stored in the mask buffer area 230. In other words, at this stage, there being no final determination as to if the currently read object be a mask the data set is temporarily stored in the mask buffer area 230, without entering an image drawing process.

On the other hand, unless the first criterion is filled (NO at the step S103), the control flow goes to a step S105 to have the object image data set processed as a usual data for image drawing. More specifically, the format of image data set is converted from an RGB form to a CMYK form, where black pixels are converted to real black being C=M=Y=1, K=0. The image to be drawn is thereby given an enhanced reproducibility of black. After binarization, the data set is to be raster-operated in accordance with an associated ROP code.

In either case, at a step S112, it is determined if the process for a current page is completed. If it is completed (YES at the step S112), the flow goes to a step S113 to output a binary page data composed of a series of image data sets having been accumulated till then in the destination area 210, before the present process goes to an end. Unless the process for the current page is completed (NO at the step S112), the flow again goes to the step S101 to repeat the process described.

As a result of determination by a check for a stored data in the mask buffer area 230 at the step S102, if the mask buffer area 230 has a stored data (YES at the step S102), the flow goes to another decision step S106, where it is determined whether or not the image data set of the currently read object is a real image of the stored data in the mask buffer area 230. It is noted that the data set of the object of real image is to be operated together with a data set of an object of mask to draw an image that has a transparent region as described. As will be described later, the mask buffer area 230 is to be cleared after a process based on the above-noted determination, and any data stored in the mask buffer area 230 should be a set of image data of a previously read image drawing object.

The image drawing object is assumed as carrying no direct information to know if its data set represents a real image, so the determination as to whether or not the data set of the currently read object represents a real image of a data set stored in the mask buffer area 230 is made in the following manner.

There is a second criterion to be filled, including two requirements being a condition 3 and a combination of four alternate conditions 4 to 7, to be both met to finally determine the data set of the currently read object to represent a real image of a data set stored in the mask buffer area 230.

Condition 3: an image drawing region of a set of image data of object stored in the mask buffer area 230 being identical in terms of pixel positions to an image drawing region of a set of image data of the currently read object. For instance, the two image data sets may be determined as having an identical image drawing region if they have an identical start point for image drawing and an identical image drawing size;

Condition 4: an ROP code of the currently read object being "D OR S", subject to a previously read object having an ROP code of "D AND S" and the image data set thereof stored in the mask buffer area 230;

Condition 5: an ROP code of the currently read object being "D AND S", subject to a previously read object having an ROP code of "D OR /S (i.e. NOT S)" and the image data set thereof stored in the mask buffer area 230;

Condition 6: an ROP code of the currently read object being "D OR S", subject to a previously read object having an ROP code of "D AND /S (i.e. NOT S)" and the image data set thereof stored in the mask buffer area 230; and Condition 7: an ROP code of the currently read object being "D AND S", subject to a previously read object having an ROP code of "D OR S" and the image data set thereof stored in the mask buffer area 230.

As a result, if the image data set of the currently read object is determined as representing a real image of the image data set of object stored in the mask buffer area 230 (YES at the step S106), it can be concluded that the image data set of object stored in the mask buffer area 230 should be a mask data to be combined with the real image data set, and the flow goes to a step S107 to draw the image data set of object stored in the mask buffer area 230 as a mask.

More specifically, the format of the stored image data set is converted from an RGB form to a CMYK form, where black pixels are converted to composite black being C=M=Y=K=0. This data set is thereby allowed to work as a mask in raster operation. After binarization, the data set is to be raster-operated in accordance with an associated ROP code.

At a step S108, the image data set of the currently read object is processed as a usual data to draw an image. This image drawing process is varied in accordance with a corresponding one of the above-noted conditions 4 to 7.

For the condition 4 as correspondent, the format of image data of the currently read object is converted from an RGB form to a CMYK form, where pixel data of the currently read object are processed in the following manner in accordance with values of pixels in correspondent positions in an associated mask (e.g. the mask 30m in FIG. 5B). Pixel values of mask can be got by reference to the image data set stored in the mask buffer area 230.

That is, for those black pixels in the currently read object whereto pixels in corresponding positions in the mask (e.g. mask 30m in FIG. 5B) have values representing a background (white), i.e., C=Y=M=K=1, their pixel values are converted to C=M=Y=K=0 being composite black. They are thus allowed to see through by raster operation. And, after binarization, at a sub-step S108a, a raster operation is performed in accordance with an associated ROP code (D OR S).

Supplemental description will be made with reference to FIGS. 5A to 5C as an example. The mask 30m in FIG. 5B is an entirety of mask data including a transparent white region. The real image 30a in FIG. 5C has a peripheral black region to be transparent. As the condition 4 (for the ROP code of the currently read object to be "D OR S") is met, the OR operation between a region 40a of the destination D and the transparent region of the real image 30a (the black region surrounding the star) gives a result illustrated at 40 in FIG. 5C (as the white region of the mask is transparent), and in the real image 30a, the peripheral region to be transparent about the star is made black. In other words, in order for the mask function to be effective for C, M, Y, and K, black pixels in the currently read object have their C, M, Y, and K values rendered '0'. For the OR operation, respective values of destination D are held as they are if the value of source S is '0' (black), and for the transparent region 40a, values of destination D are held to be correct.

On the other hand, for those black pixels in the currently read object (e.g. inside the star of the real image 30a in FIG. 5C) whereto pixels in corresponding positions in the mask (e.g. mask 30m in FIG. 5B) have values representing a filled region (with black), i.e., C=Y=M=K=0, their pixel values are converted to C=M=Y=1, K=0 being real black. The image to be drawn is thus allowed to have an enhanced black reproducibility. After binarization, a raster operation is performed in accordance with an associated ROP code (D OR S).

Additional description will be made with reference to FIGS. 5A to 5C as an example. The mask 30m in FIG. 5B has a star-shaped black region as a region to be finally overwritten by real data. For the OR operation, pixel values of any region of destination D are rewritten to values of source S if the region is black (0). To this point, it is desirable to show the region by real black, and associated pixel values are processed to be C=M=Y=1, K=0. As the region desired to overwrite is set to '0' as described, such real black values can be OR-operated to provide a correct result.

Figure 6:
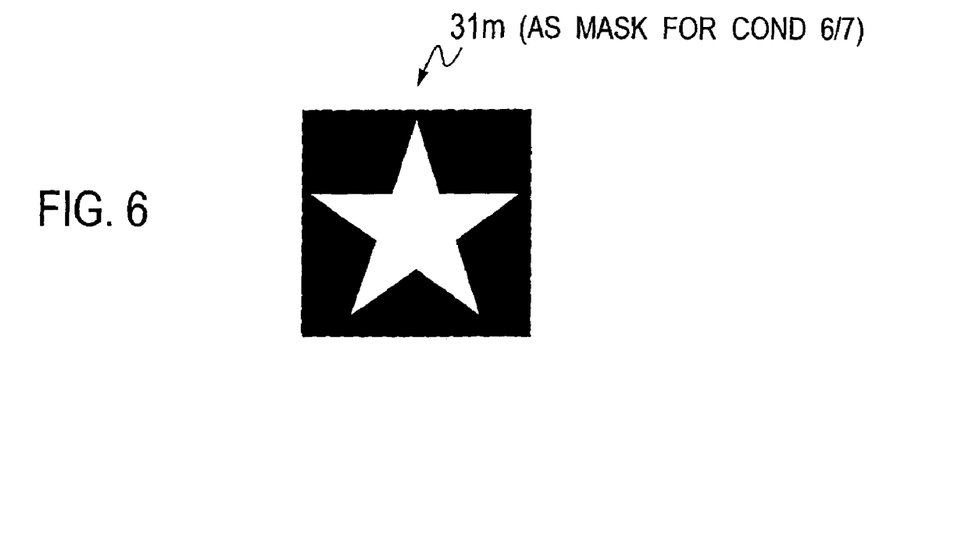
FIG. 6 is an illustration of a mask object.

For the condition 6 to be correspondent, at the sub-step 108a, like process to the condition 4 is applicable. However, in this case, in the mask 30m of FIG. 4F employed for the condition 4, colors of the black and white regions are mutually inverted, so such a mask 31m as illustrated in FIG. 6 is used as a mask data.

Figure 7:
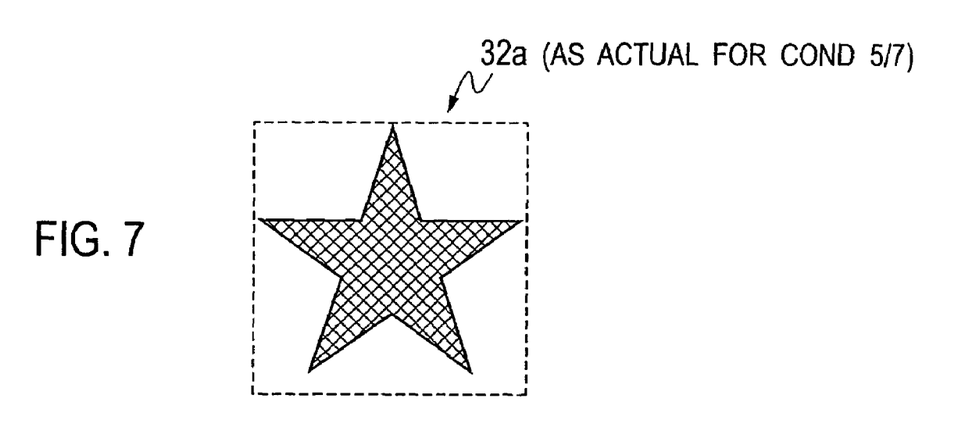
FIG. 7 is an illustration of a real-image object.

For the condition 5 to be correspondent, first, such a real image 32a as illustrated in FIG. 7 is used as a real image data, in place of the real image 30a illustrated in FIG. 4G In other words, the real image to be used has a transparent region expressed in white. For mask data, the mask 30m illustrated in FIG. 4F is applicable.

Figure 8A:
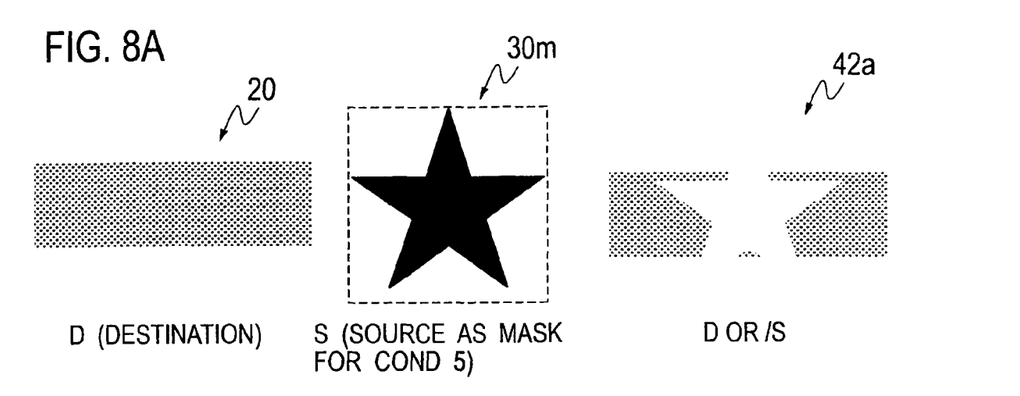
FIGS. 8A and 8B provide a set of illustrations for explanation of raster operations using an object with a transparent region.

Therefore, in the process at the step S107, using the background 20 as a destination D and the mask 30m as a source S as illustrated in FIG. 8A, there is made an operation of "D OR /S (i.e. NOT S)" to the mask for the condition 5, obtaining an image 42a.

Figure 8B:
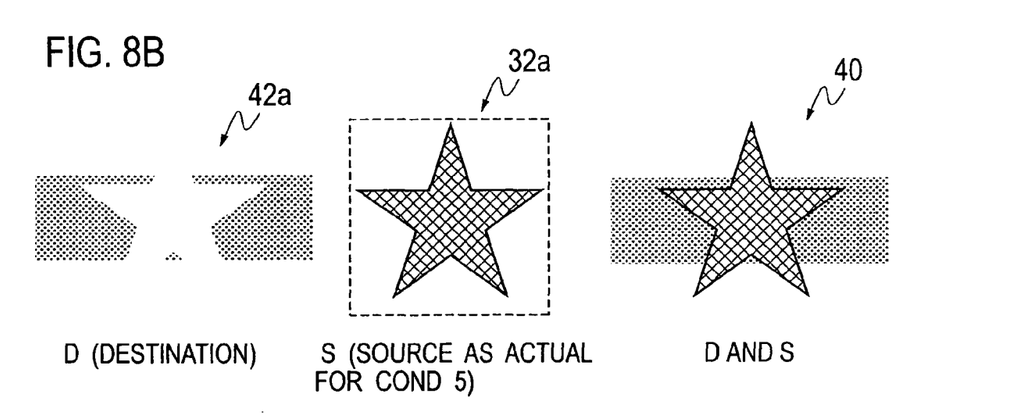

Then, in the process at the step S108, the format of image data of the currently read object is converted from an RGB form to a CMYK form. Along therewith, at a sub-step S108b, pixel values of black in the object are converted to C=M=Y=1, K=0 being real black. The image to be drawn is thus allowed to have an enhanced black reproducibility. After binarization, a raster operation is performed in accordance with an associated ROP code (D AND S). In other words, there is no need to switch the manner of conversion of black depending on a pixel value at a corresponding location in the mask, thus allowing for a uniform conversion to real black without exception. It therefore is possible to obtain such a superimposed image 40 as illustrated in FIG. 8B, where the background image 20 is seen through the transparent region surrounding the star.

For the condition 7 to be correspondent, at the sub-step 108b, like process to the condition 5 is applicable. However, in this case, in the mask 30m of FIG. 4F employed for the condition 5, colors of the black and white regions are mutually inverted, so such a mask 31m as illustrated in FIG. 6 is used as a mask data.

On the contrary, as a result of determination in the process at the step S106 as to whether or not the image data set of the currently read object is a real image of the data set of object stored in the mask buffer area 230, unless the image data set of the currently read object is determined to be a real image of the data set of object stored in the mask buffer area 230 (NO at the step S106), it is possible to conclude that the data set of object stored in the mask buffer area 230 is not any mask. Therefore, at a step S109, the data set of object stored in the mask buffer area 230 is processed as a usual data to draw an image.

More specifically, the format of image data set is converted from an RGB form to a CMYK form, where black pixels are converted to real black being C=M=Y=1, K=0. The image to be drawn is thereby given an enhanced reproducibility of black. After binarization, the data set is to be raster-operated in accordance with an associated ROP code.

At a step S110, the image data set of the currently read object is processed as usual data to draw an image. More specifically, the format of image data set of the object is converted from an RGB form to a CMYK form, where black pixels are converted to real black being C=M=Y=1, K=0. The image to be drawn is thereby given an enhanced reproducibility of black.

In either case, after binarization, a raster operation is performed in accordance with an associated ROP code. Thereafter, at a step S111, the mask buffer area 230 is cleared.

At the step S112, it is determined if the process for the current page is completed. If it is completed, the flow goes to the step S113 to output a binary page data composed of a series of image data sets having been accumulated till then in the destination area 210, before the present process goes to an end. Unless the process for the current page is completed, the flow again goes to the step S101 to repeat the process described.

As will be seen from the foregoing embodiments, according to the present invention, black color of pixels in an object as determined to be a mask is converted to composite black, and that of pixels in an object as determined not to be any mask is converted to real black, thus allowing for an improved color reproduction in a raster operation of image drawing objects having a transparent region without losing a mask function.

This application is based on the Japanese Patent Applications No. 2008-076585, filed on Mar. 24, 2008, the entire content of which is incorporated by reference herein While preferred embodiments of the present invention have been described using specific terms, such description is for illustrative purposes, and it is to be understood that changes and variations may be made without departing from the spirit or scope of the following claims.

What is claimed is:

1. An image processing system adapted to input a sequence of image drawing objects each respectively including a set of data on pixels of a cell of color image and a raster operation code, hold a set of pixel data of an arbitrary object to be processed as a source for a raster operation in accordance with an associated raster operation code, and hold a set of pixel data of an object to be output as a destination, the system comprising:

a determiner configured to determine an n-th input object (n being an integer) to be a mask, as the n-th input object fills a first criterion as requisite for the n-th input object to be determined as a mask, and an n+1-th input object fills a second criterion as sufficient for a presumption for the n+1-th input object to be masked by the n-th input object;

a converter configured for a color conversion to convert a data of a pixel of black in an object as determined to be a mask into a pixel data of composite black, and convert a data of a pixel of black in an object as not determined to be any mask into a pixel data of composite black or real black; and a processor configured to operate and process as a source a set of pixel data of an object as color-converted.

2. The image processing system according to claim 1, wherein the converter is configured to convert a pixel data of a first pixel of black in an m-th input object (m being an integer) as not determined to be any mask into a pixel data of composite black, as the first pixel corresponds in pixel position to a pixel of white in an m−1-th input object as determined to be a mask, and convert a pixel data of a second pixel of black in the m-th input object into a pixel data of real black, as the second pixel corresponds in pixel position to a pixel of color else than white in the m−1-th input object as determined to be a mask.

3. The image processing system according to claim 1, wherein the first criterion comprises a pair of first and second conditions, wherein the first condition is that each pixel in the n-th input object is black or white, and the second condition is that a raster operation code of the n-th input object is:

"D (destination) AND S (source)";

"D OR (NOT S)";

"D AND (NOT S)"; or

"D OR S".

4. The image processing system according to claim 3, wherein the second criterion comprises a pair of third and fourth conditions, wherein the third condition is that a drawing region of the n+1-th input object overlaps a drawing region of the n-th input object, and the fourth condition is that a raster operation code of the n+1-th input object has a correspondence relationship to the raster operation code of the n-th input object as follows:

"D OR S" to "D AND S";

"D AND S" to "D OR (NOT S)";

"D OR S" to "D AND (NOT S)"; or

"D AND S" to "D OR S".

5. The image processing system according to claim 1, wherein the processor comprises a binarizer configured to binarize a pixel data of the object as color-converted by prescribed colors.

6. An image processing method, comprising:

inputting a sequence of image drawing objects each respectively including a set of data on pixels of a cell of color image and a raster operation code;

holding a set of pixel data of an arbitrary object to be processed as a source for a raster operation in accordance with an associated raster operation code;

holding a set of pixel data of an object to be output as a destination;

determining an n-th input object (n being an integer) to be a mask, as the n-th input object fills a first criterion as requisite for the n-th input object to be determined as a mask, and an n+1-th input object fills a second criterion as sufficient for a presumption for the n+1-th input object to be masked by the n-th input object;

performing a color conversion to convert a data of a pixel of black in an object as determined to be a mask into a pixel data of composite black, and convert a data of a pixel of black in an object as not determined to be any mask into a pixel data of composite black or real black; and operating and processing as a source a set of pixel data of an object as color-converted.

7. A non-transitory storage medium comprising a stored program to have a computer execute an image processing method according to claim 6.

* * * * *